(12) United States Patent
Brey (10) Patent No.: US 9,088,143 B2
(45) Date of Patent: Jul. 21, 2015

(54) APPARATUS AND METHOD FOR MOUNTING AN ELECTRICAL JUNCTION BOX

(71) Applicant: Gerald Macaulay Brey, Beaumont, CA (US)

(72) Inventor: Gerald Macaulay Brey, Beaumont, CA (US)

( * ) Notice: Subject to any disclaimer, the term of this patent is extended or adjusted under 35 U.S.C. 154(b) by 101 days.

(21) Appl. No.: 13/763,692

(22) Filed: Feb. 10, 2013

(65) Prior Publication Data

US 2014/0224533 A1   Aug. 14, 2014

(51) Int. Cl.
*H02G 3/12* (2006.01)
*H02G 3/10* (2006.01)

(52) U.S. Cl.
CPC .............. *H02G 3/105* (2013.01); *H02G 3/123* (2013.01); *Y10T 24/1498* (2015.01)

(58) Field of Classification Search
CPC ........... H02G 3/12; H02G 3/105; H02G 3/00; H02G 3/123; B65D 63/1027; H01R 13/60; H01R 13/66
USPC ......... 174/50, 480, 481, 503, 53, 58; 220/3.3, 220/3.4, 3.5, 3.6, 3.7, 402; 248/906
See application file for complete search history.

(56) References Cited

U.S. PATENT DOCUMENTS

| | | | | |
|---|---|---|---|---|
| 4,788,751 | A | * | 12/1988 | Shely et al. ................. 24/16 PB |
| 5,628,419 | A | * | 5/1997 | Putz ............................... 220/3.3 |
| 7,048,575 | B2 | * | 5/2006 | Kidman ........................ 439/538 |
| 7,129,411 | B2 | * | 10/2006 | Bump et al. .................... 174/58 |

FOREIGN PATENT DOCUMENTS

| | | | | |
|---|---|---|---|---|
| DE | 2213277 | A1 | | 9/1973 |
| DE | 3041919 | A1 | | 6/1982 |
| DE | 4443519 | A1 | * | 10/1995 ............... H02G 3/12 |
| EP | 1944846 | A1 | | 7/2008 |
| EP | 1205014 | B1 | * | 8/2009 ............... H02G 3/12 |
| FR | 2147029 | A1 | * | 3/1973 ............... H02G 3/12 |
| NL | 1020862 | C2 | | 12/2005 |
| WO | 01/31759 | A1 | | 5/2001 |

* cited by examiner

*Primary Examiner* — Timothy Thompson
*Assistant Examiner* — Guillermo Egoavil
(74) *Attorney, Agent, or Firm* — Robert S. Smith (57) ABSTRACT

An apparatus for attachment to a wall or wallboard including a housing having first and second sides; first and second elongated strap members each having first and second opposed sides, each strap member having first and second rack gears extending longitudinally along the respective strap member, the longitudinal position of the second rack gear being offset with respect to the first rack gear, each member having first and second axial extremities, the second axial extremity of each of the strap members including a U-shaped claw, each the claw including a contact surface extending generally in a direction away from a side of a respective strap whereby the claws may be inserted into a hole in an associated wall and the respective strap members can thereafter be passed through the respective receiving channels to secure the housing.

8 Claims, 6 Drawing Sheets

APPARATUS AND METHOD FOR MOUNTING AN ELECTRICAL JUNCTION BOX

RELATED APPLICATIONS

This application is a continuation of provisional U.S. application 61/600,838 filed Feb. 20, 2012 which is incorporated herein in its entirety.

FIELD OF THE INVENTION

The invention has particular application to methods and apparatus for mounting electrical junction boxes. Junction boxes may be metal or plastic, often measure 2½ inches or 3½ inches deep and house the ends of wires that are joined together within the box. The mounting typically secures the junction box to a strong structural member such as a stud or joist if the box will be used to support a light fixture. Other types of junction boxes may utilize wing shaped members that fit inside a drywall cut-out hole. Such wing shaped members that function like the wings of a toggle bolt, are often difficult to install.

Typically cable clamps secure Romex® or BX cable or other wiring that comes into the box in which the wires are joined by wire nuts. Romex® is a trademark applied to non-metallic building electrical wires and cables. The term BX cable refers to a cable that consists of one or more wires within flexible metal tubing, used chiefly in wiring buildings and in supplying electric power to equipment. More particularly, the present invention relates to the mounting of a box or ring assembly which has a means of securing the box or ring to sheet wallboard material.

BACKGROUND OF THE INVENTION

The prior art includes conventional remodel boxes and rings that require cutting and other tools as well as substantial time for installation in sheet material. In addition the prior art apparatus is limited to installation on wallboard materials that are ½" thick or less. The prior art mounting apparatus limited by the thickness of the material in which they are installed within. When the wall has a thickness that is greater than ½" thick, additional tools are required for installation as well as additional labor for installation.

Cable ties are widely used. Typically in the most popular form, a cable tie consists of a sturdy nylon tape with an integrated rack gear, and on one end a ratchet that engages the rack when installed. Once the pointed tip of the cable tie has been pulled through the case and past the ratchet, it is prevented from being pulled back; the resulting loop may only be pulled tighter. This allows several cables to be bound together into a cable tree. A cable tie tensioning device or tool may be used to apply a cable tie with a specific degree of tension. A tool may also cut off the axial extremity or tail of the tape flush with the head in order to avoid a sharp edge which might otherwise cause injury. In order to increase resistance to ultraviolet light in outdoor applications, a specific grade of nylon containing a minimum of 2% carbon black is used to protect the polymer chains and extend the cable tie's service life. An understanding of such devices facilitates an understanding of the one embodiment of the present invention.

In new construction, electrical work boxes are generally mounted to exposed studs or framing elements using nails or screws. In existing construction, electrical work boxes may be affixed to existing walls, including wallboard, lathe and plaster or other wall surfaces that have been mounted over framing. Such boxes are commonly referred to as old work boxes.

The prior art includes U.S. Pat. No. 7,129,411 issued to Jeffrey A. Bump on Oct. 31, 2006. The patent describes an apparatus therein that is directed to the fastening field, particularly to the mounting of devices, such as an electrical box, within a component, such as an opening in wallboard. The apparatus described includes mounting an electrical work box that may be metallic or of thermoplastic composition, designed to support an electrical device. The electrical device may be a switch or plug receptacle in single, dual or multiple "gang" configurations, a lighting fixture, a ceiling fan, a speaker, or an alarm. The electrical work box may also provide wiring junctions for electrical applications, such as low voltage applications (defined as less than 50 volts) associated with audio/visual devices, telephone devices and computer networking devices. The apparatus includes a tape that includes an integrated rack gear for securing the box.

The mounting of some prior art work boxes may include one or more pressure/spring retaining latch. Such latches are usually vertically and/or horizontally mounted to the exterior sides of the boxes and allow the box to be pushed through a wall opening. Once through the opening, the latches deploy by spreading beyond the rear edge of the wall opening. Pawls, commonly referred to as ears, wings, or fingers, are mounted on two or more opposing corners of the electrical work box. When deployed by means of a tightening screw, the pawls, in conjunction with opposing flanges integrally mounted on the front edges of the box, serve to clamp the box to the wall.

The retaining mechanisms employing latches and pawls often fail to securely mount the old work boxes in place. Where wall thickness varies, a thicker than typical wall may preclude pressure/spring retaining latches from expanding. A thinner than normal wall may result in space between the retaining latch and the rear wall surface and allow the box to move back and forth within the wall. Irregularities in the posterior wall surface in lathe and plaster walls or in insulating materials may also prevent pressure/spring retaining latches and/or screw activated pawls from properly deploying. Further, in mounting electrical boxes using screw activated pawls, deployment of the pawls may over tighten the screw, resulting in stripping the threads in the pawl or breaking the wall material. As a result, the box must be dismounted and discarded and installation must be started over with a new box or in a new location.

While the apparatus described in the Bump patent may be acceptable for some applications there are still difficulties that complicate installation of electrical junction boxes there is a need for a more reliable, quicker to use, and more versatile fastening system for such boxes.

SUMMARY OF THE INVENTION

It is an object of the present invention to provide a more secure mounting of an electrical box to a sheet material such wallboard mounted on studs of a building.

A further object of the invention is to provide an apparatus and method that is more convenient and faster to install than the prior art apparatus and methods.

Yet another object of the invention is to provide such a mounting that is inexpensive and may be installed rapidly.

It has now been found that these and other objects of the present invention may be achieved in an apparatus for attachment to an associated planar member such as wall or wallboard which includes a housing having first and second sides; first and second elongated strap members each having first and second opposed sides, each strap member having first and second rack gears extending longitudinally along the respective strap member, the longitudinal position of the second rack gear being offset with respect to the first rack gear, each member having first and second axial extremities, the second axial extremity of each of the strap members including a U-shaped claw, each the claw including a contact surface extending generally in a direction away from a side of a respective strap; a first receiving channel disposed on the first side; a second receiving channel disposed on the second side, each receiving channel including first and second ratchets, each ratchet being dimensioned and configured for engagement respectively with one of the first and second rack gears whereby the claws may be inserted into a hole in an associated wall and the respective strap members may be thereafter be passed through the respective receiving channels to secure the housing in abutting relationship to the associated wall.

In some embodiments the first and second sides of the housing are opposed sides, the housing is an electrical junction box the strap members are flexible and may be nylon. Other embodiments have strap members having first and second rack gears extending longitudinally along the respective strap member on the same side thereof and laterally spaced first and second ratchets respectively engage the first and second gear racks. The apparatus may have all rack gears with the same pitch and same gear shapes a well as the longitudinal offset of the second ranking here from the first rack gear is equal to ½ the distance between adjacent gears in the first rack gear Each of the contact surfaces is disposed in oblique relationship to a side of a respective strap to which the contact surface is attached with the outboard extremity thereof being closer to the first end of the strap than the rest of the contact surface. In some cases each of the contact surfaces is disposed at an angle of between 3 and 9 degrees to a side of a respective strap to which the contact surface is attached with the outboard extremity thereof being closer to the first end of the strap than the rest of the contact surface.

Another embodiment of the present invention is a wire tie for which includes an elongated strap member having first and second opposed sides, the strap member having first and second rack gears extending longitudinally along the strap member, the longitudinal position of the second rack gear being offset with respect to the first rack gear and a receiving channel secured to and one end of the strap that includes first and second ratchets each and dimensioned and configured for engagement respectively with the first and second rack gears.

BRIEF DESCRIPTION OF THE DRAWING

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention. Those skilled in the art will understand that the devices and methods specifically described herein and illustrated in the accompanying drawings are non-limiting exemplary embodiments. The features illustrated or described in connection with one exemplary embodiment can be combined with the features of other embodiments. Such modifications and variations are intended to be included within the scope of the present invention.

DESCRIPTION OF THE PREFERRED EMBODIMENTS

It is noted that the terms "first," "second," and the like, as well as "primary," "secondary," and the like, herein do not denote any amount, order, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the bearings(s) includes one or more bearings). The endpoints of all ranges directed to the same component or property are inclusive and independently combinable (e.g., ranges of "up to about 5°, or, more specifically, about 0.5° to about 3°" is inclusive of the endpoints and all intermediate values of the ranges of "about 0.5° to about 5°," etc.).

Referring now to FIGS. 1-11 there is show an apparatus 10 in accordance with one embodiment of the present invention for mounting an electric utility box is secured to the back of wallboard or the like in a manner that constitutes a substantial improvement over the prior art.

Figure 1:
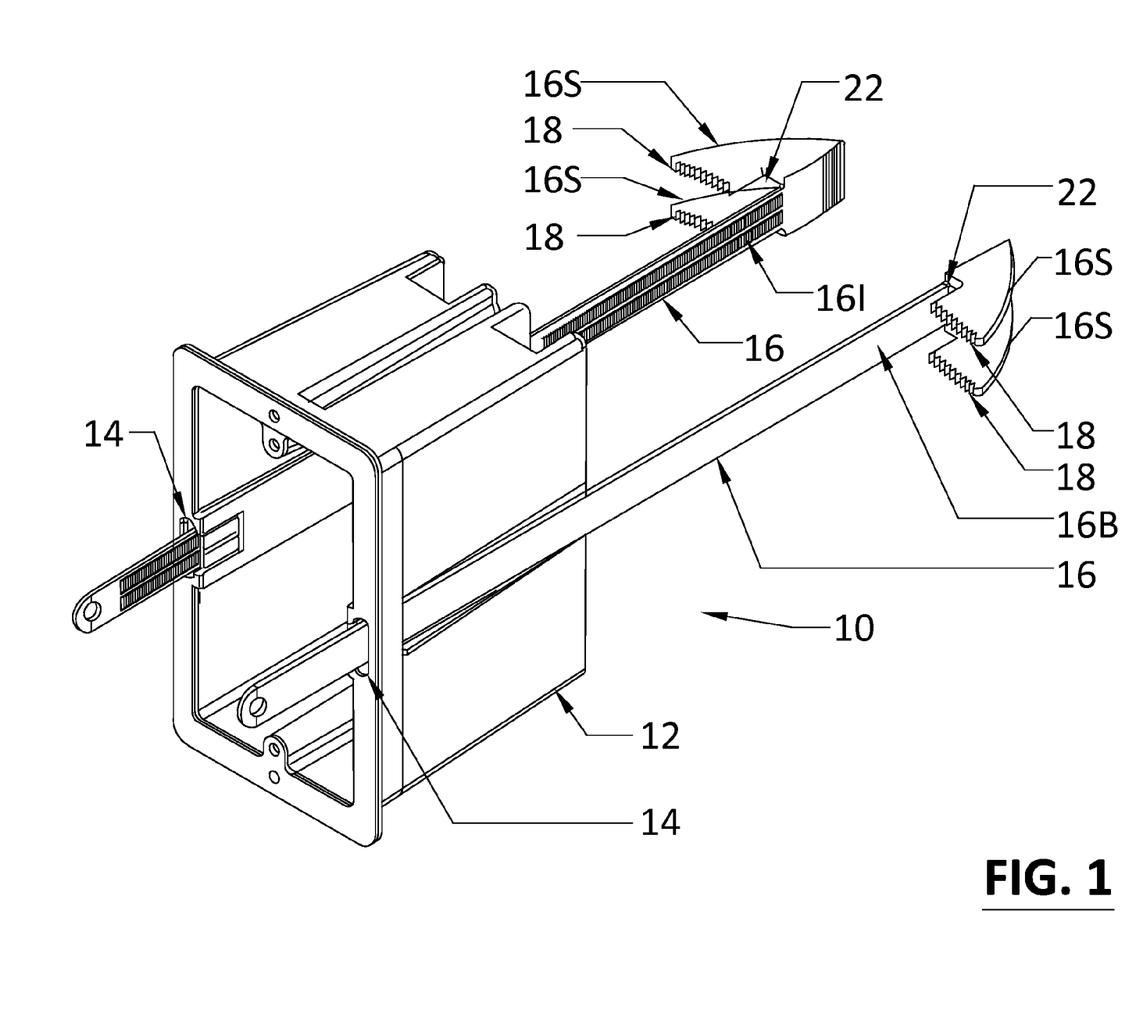
FIG. 1 is an isometric view of a preferred embodiment of the present invention illustrating an electrical junction box that incorporates dual integral contact surfaces within guide channels for receiving respective first and second strap assemblies to secure the box.
Figure 2:
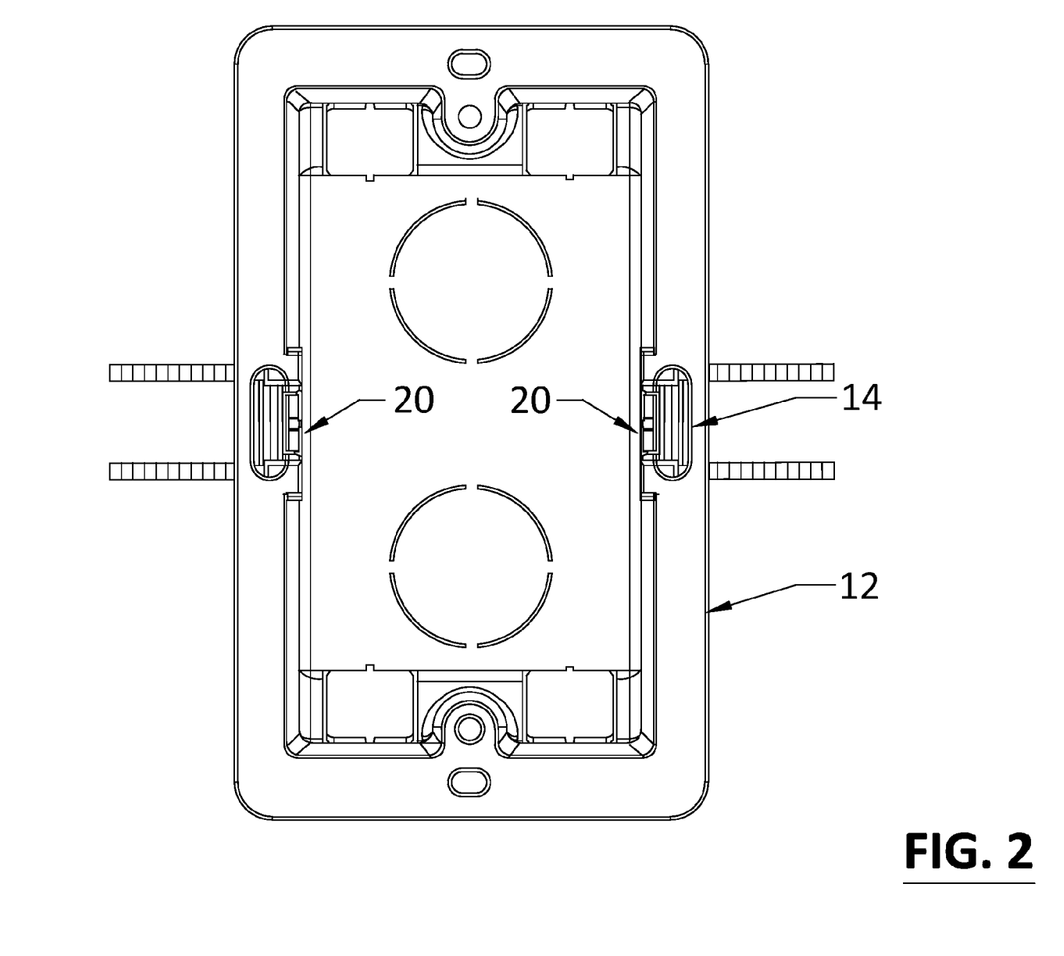
FIG. 2 is a front view of the box shown in FIG. 1.
Figure 3:
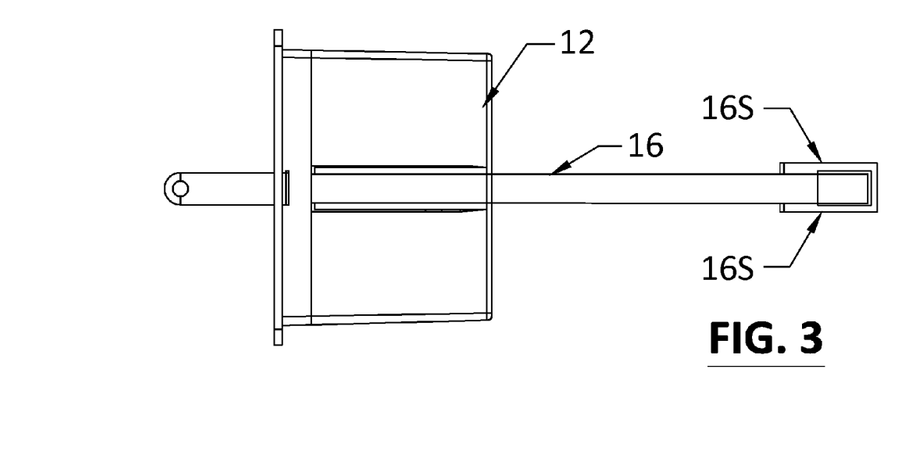
FIG. 3 is a side view of the box and one strap assembly.

The attachment apparatus of the present invention comprises an assembly 10 that includes an electrical junction box 12 having first and second opposed guide receiving assemblies 14 for receiving respective first and second strap assemblies 16. Each strap assembly 16 incorporates an improvement over the known cable tie. Each strap assembly 16 includes an inboard side 16*i* and an outboard side 16*o*. In a preferred embodiment the respective outboard sides includes respective first and second axially extending arrays of contact surfaces or teeth. Each array constitutes a rack gear having a plurality of teeth. The teeth in the respective arrays on each strap assembly 16 have the same pitch and in a preferred embodiment the identical tooth form. The respective arrays are offset an amount equal to one-half the pitch of the respective arrays. Those skilled in the art will recognize that the pitch is equal to the distance between successive gear teeth in a gear including but not limited to a rack gear.

In the illustrated preferred embodiment the teeth in the respective axially extending arrays comprise the inboard surface 16i of each respective strap assembly 16. Thus, the respective arrays of teeth on each strap assembly 16 face the center of the box 12 or ring when installed in respective receiving assemblies 14 formed in the box 12. The receiving assemblies 14 are each sleeve shaped and dimensioned and configured for receiving a respective strap assembly 16. Disposed in each sleeve assembly of each receiving assembly 14 are respective ratchets or mating teeth 20 that face and engage the respective axially extending arrays of teeth on the inboard side 16i of the respective strap assemblies 16.

Each strap assembly 16 has a first end and a second end. The first ends shown at the left side of FIG. 1 are dimensioned and configured for insertion into one of the receiving assemblies 14. The second ends of each strap assembly, in the preferred illustrated embodiment include first and second generally U-shaped claw 16s that extend outboard of the outboard side 16b of each strap 16. Each claw 16s includes a face 18 dimensioned and configured to engage the inner face (the face that is not visible within the room having the wall) of the wallboard in which the box 12 is to be mounted.

In a preferred embodiment the face 18 is disposed at an angle of less than 90 degrees with respect to the outer face 16b of the strap 16. Typically, the angle is about 6 degrees. Because the back face of the wallboard or plaster may be irregular/not smooth it has been found that the inclination of the face 16 provides better engagement and thus more secure mounting of the box 12. The contact surface or face 18 of the claws has a knurled pattern to allow the surface to grab and lock to the material surface in which the box or ring assembly is installed.

The respective claws 16s on each strap have a slot 22 disposed intermediate the outboard side 16b of the strap and the body of the claw 16s that allows clearance with respect to the receiver assemblies 14. When the installation is complete the respective faces 18 may be only ½ inch from a plane that passes through the front of the box 12. Thus, the clearance provided by the slot 22 is important.

The receiving assemblies 14 are comprised of an external channel to guide the strip and claw assembly to the strip receiving assembly which has corresponding teeth to lock either set of teeth in the strip in place when inserted. Each strip receiving assembly 14 is recessed from the front face of the box or ring in a manner to allow the strip to be folded back without extending beyond the leading surface of the box or ring assembly after installation thus eliminating the need for additional tools for installation.

Before mounting the box 12 within a wall, the strap assemblies 16 are inserted into the receiving assemblies 14 in the manner shown in FIG. 1. This relationship is also shown in the FIG. 5 top view of the assembly 10. Both strap assemblies 16 initially engaged with the respective receiving assemblies 14 in the box 12. These figures illustrate the relative positions thereof before the straps assemblies 14 are axially displaced further to fully seat them in a manner that will lock the box in a desired position. This position illustrates the desired relationship of the straps and the box before installation into an opening in the wall. At the time of installation the second ends (upper as viewed) ends of the straps 16 are deflected to allow insertion into an opening in wallboard. After installation the second ends of the strap assemblies spring back with to a position where the respective axis of each strap assembly is rectilinear. Accordingly, the respective claws 16s and the faces 18 will engage the back side of the wallboard as the installer axially moves the straps assemblies 16 receiving assemblies 14 to anchor the box 12 against the wallboard.

The apparatus of the present invention improves over known cable ties by providing a strap 16 that has first and second side by side rack gears defined on one side of the strap. In a preferred embodiment, the rack gears are parallel and have identical tooth forms and pitch with the respective longitudinal extents of respective rack gears being offset or out of phase an amount equal to one half the pitch of the rack gears. Cooperating with the respective rack gears are respective first and second ratchets or mating teeth 20 in the respective receiving assemblies 14 in the box 12. The respective ratchets 20 are disposed in side by side relationship and operate independently of each other. This geometric relationship results in a mechanism in which locking engagement may be achieved at intervals that are not merely equal to the distance between successive teeth in the rack gears (the pitch of the rack gear) but half of that distance. Thus, the mechanism has advantages for a wide variety of applications including but not limited to the mounting for an electrical box carried on a sheet material such wallboard mounted on the studs of a building as will be described hereafter.

The apparatus in accordance with the present invention having offset rack gears and knurled claw faces 18 results in an easy, tight and secure installation in materials of varying thickness and consistency. By offsetting the respective gear teeth the apparatus in accordance with the present invention is able to achieve a tighter connection by reducing the possible locking interval distance between teeth by 50%. The sets of teeth alternate locking as the strip is installed into the receiving end from set to set. Angling and knurling the contact surface of the claw portion of the strip assembly also improves the security of the connection between the contact surfaces and the material the box or ring is installed in. The term "angling" as used herein refers to the initial position of the contact surface is disposed in oblique relationship to a side of a respective strap to which the contact surface is attached with the outboard extremity thereof being closer to said first end of said strap than the rest of said contact surface. In the preferred embodiment each of the contact surfaces 18 is disposed at an angle of between 3 and 9 degrees to a side of a respective strap to which the contact surface is attached with the outboard extremity thereof being closer to said first end of said strap than the rest of said contact surface.

The apparatus in accordance with the present invention has been described with respect to the mounting of a remodel electrical boxes. Those skilled in the art will recognize the applicability to the mounting of rings, recessed and surface mount low voltage devices, access panels, as well as any other item which is attached to or in wall surfaces including shear walls.

The claimed invention differs from what currently exists. The design of the strip with offset and staggered teeth and the angled and knurled claw assembly will allow an easy, tight and secure installation in materials of varying thickness and consistency. This invention is an improvement on what currently exists. The design of the strip with offset and staggered teeth and the angled and knurled claw assembly will allow an easy, tight and secure installation in materials of varying thickness and consistency. These systems do not work well because they require either an additional tool for installation or an entirely different method of connection.

The device is a box or ring assembly which has a means of securing the box or ring to sheet material of varying thickness and consistency comprised of a plurality of receiving components as part of the box or ring assembly and separate male components which are flexible strips which are inserted into and through the receiving component. The box or ring has an integral contact surface as does the male assembly when installed together securely sandwich the wall or ceiling material the box is installed in. The male portion of the securing means is comprised of an elongated flexible strip which has offset staggered teeth which comprise the surface of the strip facing the center of the box or ring when installed in the receiving assembly and claws which face the exterior of the box or ring when inserted. The claws on the strip assembly have a notch on the contact side which will allow the strip to be inserted into the receiver to the point the remaining contact surface of the contact surface is flush with exiting end of the receiving assembly. The contact surface area of the claws are less than perpendicular to the strip to allow the outermost point of the claw to make contact with any materials the box or ring is installed in first. The contact surface area of the claws also have a knurled pattern to allow the surface to grab and lock to any material surface the box or ring assembly is installed in. The receiving portion of the securing means is comprised of an external channel to guide the strip and claw assembly to the strip receiving assembly which has corresponding teeth to lock the strip in place when inserted. The strip receiving assembly is recessed from the face of the box or ring in a manner to allow the strip to be folded back without extending beyond the leading surface of the box or ring assembly.

The device is a box or ring assembly which has a means of securing the box or ring to sheet material of varying thickness and consistency comprised of a plurality of receiving components as part of the box or ring assembly and separate male components which are flexible strips which are inserted into and through the receiving component. The box or ring has an integral contact surface as does the male assembly when installed together securely sandwich the wall or ceiling material the box is installed in. The male portion of the securing means is comprised of an elongated flexible strip which has offset staggered teeth which comprise the surface of the strip facing the center of the box or ring when installed in the receiving assembly and claws which face the exterior of the box or ring when inserted. The claws on the strip assembly have a notch on the contact side which will allow the strip to be inserted into the receiver to the point the remaining contact surface of the contact surface is flush with exiting end of the receiving assembly. The contact surface area of the claws are less than perpendicular to the strip to allow the outermost point of the claw to make contact with any materials the box or ring is installed in first. The contact surface area of the claws also have a knurled pattern to allow the surface to grab and lock to any material surface the box or ring assembly is installed in.

Figure 4:
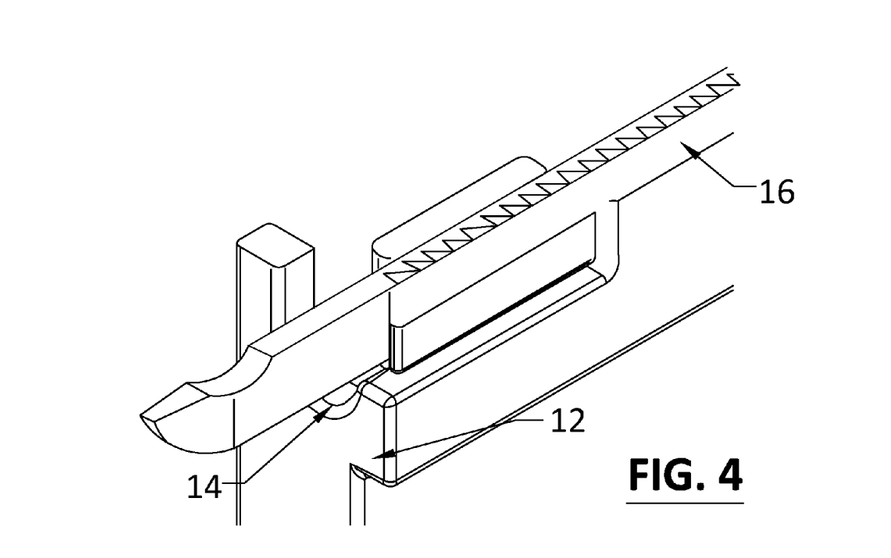
FIG. 4 is an isometric broken away view illustrating the engagement between the box and the respective strap assemblies.
Figure 5:
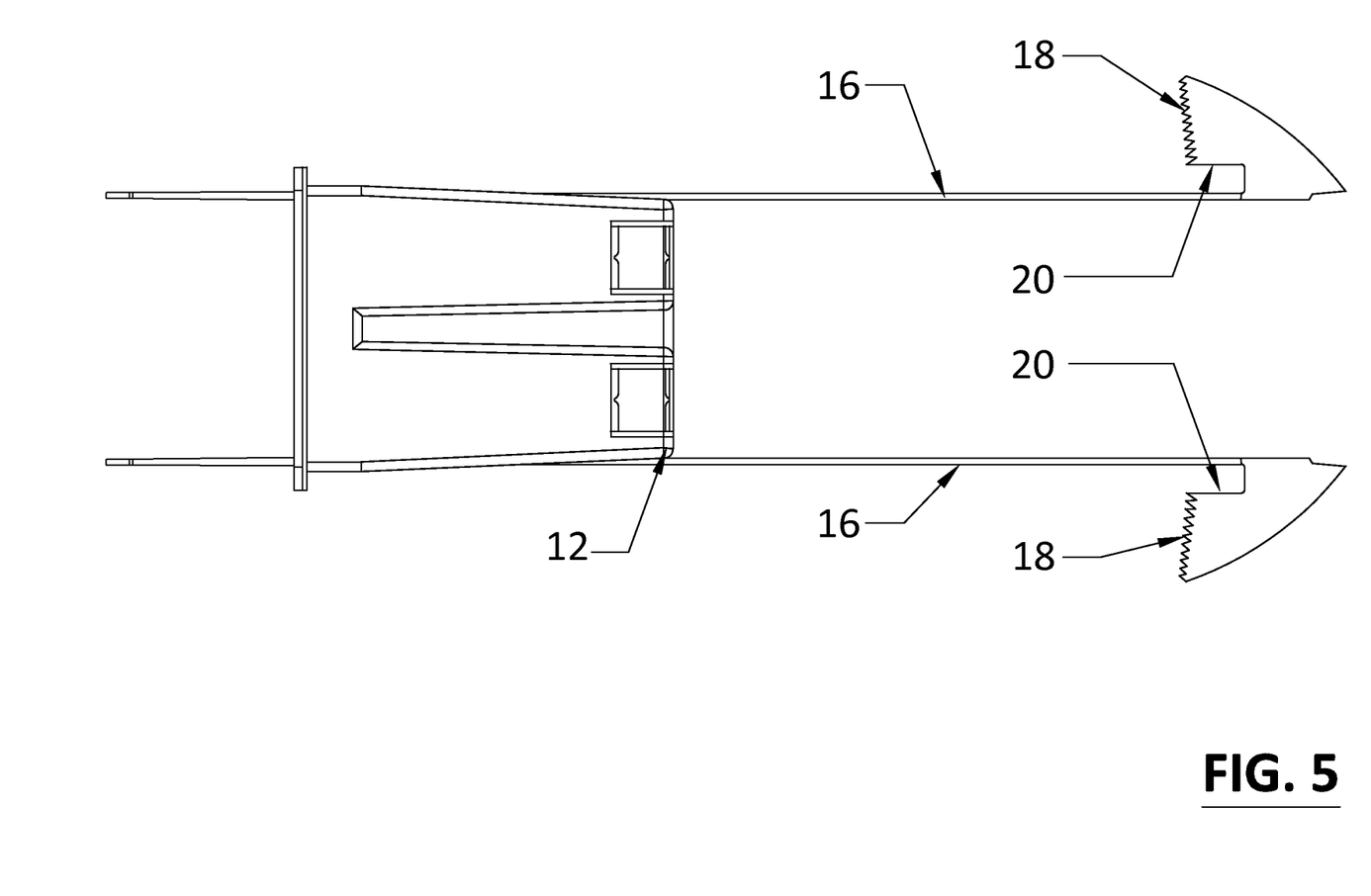
FIG. 5 is a top view of both straps initially engaged with the box that illustrates the relative positions thereof before the straps are axially displaced further to fully seat them in a manner that will lock the box in a desired position. This position illustrates the desired relationship of the straps and the box before installation into an opening in the wall. At the time of installation the upper as viewed stop ends of the straps deflect to allow insert into an opening in wallboard. After installation the stop ends engage the back side of the wallboard as the installer axially moves the straps through the channels in the box to anchor the stop ends against the back face of the wallboard.
Figure 6:
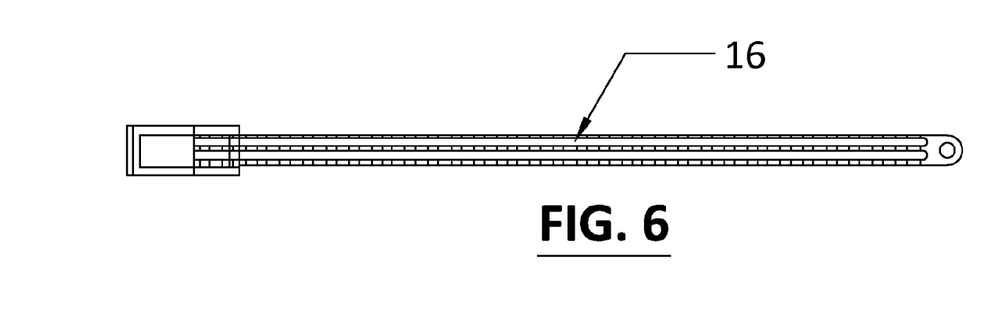
FIG. 6 is a more detailed view of the top of a strap illustrating the rack gear in accordance with the present invention.
Figure 7:
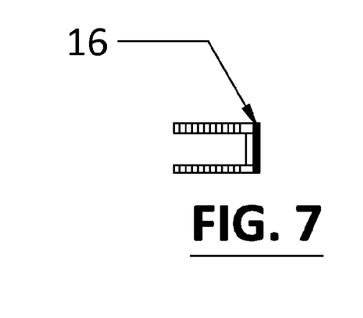
FIG. 7 is an end view of the strap illustrated in FIG. 6.
Figure 8:
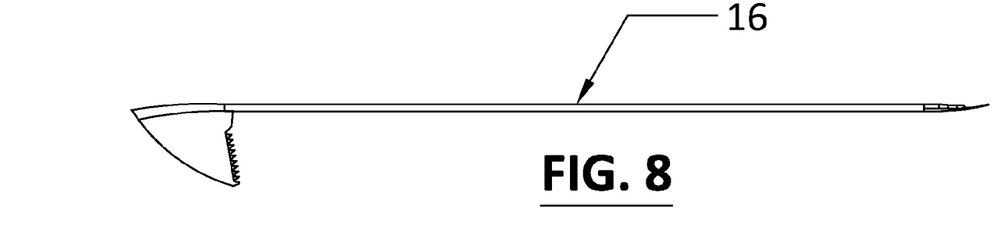
FIG. 8 is a side view of the strap illustrated in FIG. 6.
Figure 9:
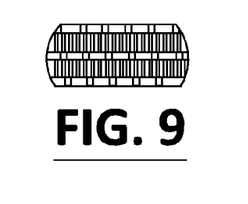
FIG. 9 is an enlarged view of an axial part of the strap shown in FIG. 6.
Figure 10:
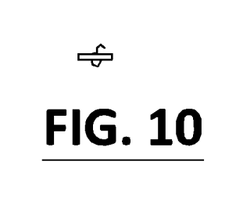
FIG. 10 is a view of the portion of the strap in FIG. 6.
Figure 11:
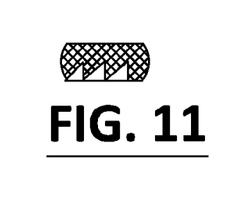
FIG. 11 is an enlarged view of the respective teeth in the rack gear of the strap illustrated in FIG. 6.
Figure 12:
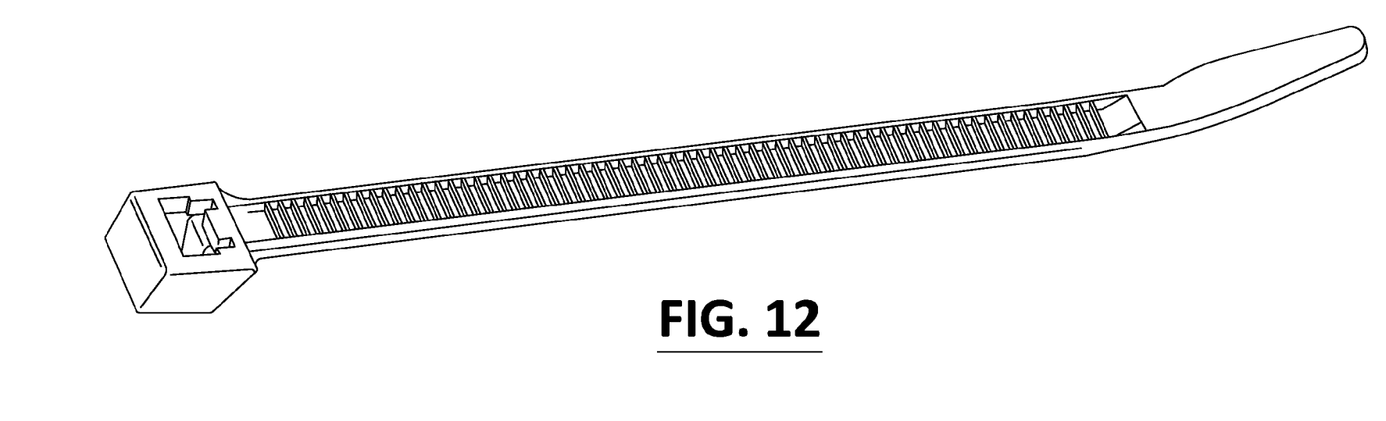
FIG. 12 is a view of a cable tie embodiment of the present invention that utilizes the ratchet mechanism and rack gears described herein.

The receiving portion of the securing means is comprised of an external channel to guide the strip and claw assembly to the strip receiving assembly which has corresponding teeth to lock the strip in place when inserted. As best seen in FIG. 4 the strip receiving assembly is recessed from the face of the box or ring in a manner to allow the strip to be folded back without extending beyond the leading surface of the box or ring assembly.

As the straps 16 are pulled tighter the outboard tip of the claw makes contact first and then rotates to allow full contact with the wall material. This mechanical function acts to also provide tension on the zip or rack gear itself between the claw and the receiver in the box thus making a more secure connection. The furthest point of the claw assembly ¼" of the tip is angled to correspond with the guide channel to allow the toothed surface of the claw to be parallel to the wall material it is installed in.

The components of the device, in a preferred embodiment, are made of plastic material formed by injection molding. The components which complete the means of connection the integral contact surfaces, the guide channels, the toothed receiving assembly, and the strip assembly with staggered sets of teeth and claws are necessary to this invention. Knurling the contact surfaces is optional which would make the invention work better.

While the description herein describes specifically the mounting of an electrical junction box, those skilled in the art will recognize that the means of attachment described herein may be applied to other types of products such as access panels or other devices eliminating the need for mounting screws and accompanying anchors. The location of the receiving assembly can be moved toward the back of the box or ring to create a reveal of an appropriate depth to allow the box or ring to be used in new construction in a shear wall. (A shear wall is a new construction wall with plywood sheathing to create lateral strength for the structure. Drywall will go over the top of it to match other finished walls.) As described herein, cable clamps may incorporate the dual rack gear construction of the present invention into both the strap as well as the head of a cable tie.

By staggering the sets of teeth on the respective strap assemblies we are able to achieve a tighter connection by reducing the distance between teeth by 50%. The sets of teeth alternate locking as the strip is installed into the receiving end from set to set. Angling and knurling the contact surface of the claw portion of the strip assembly also improves the security of the connection between the contact surfaces and the material the box or ring is installed in.

The embodiment illustrated of the present invention shows a strap with inward facing rack gear teeth and a receiving channel with an outward facing ratchet. Those skilled in the art will recognize that these directions may be reversed in other embodiments.

The description herein refers to a strap having parallel rack gears on one face thereof. It will be understood that other embodiments a first rack gear may be deposed on one side of a strap and a second ring gear may be disposed on a be second or opposite side of the strip. In such embodiments the second rack gear may be longitudinally offset with respect to the first rack gear. In such embodiments the respective first and second ratchets may be mounted on imposed sides of the strap to achieve the desired small incremental steps necessary for very secure fastening. Although the preferred embodiment utilizes to rack gears having identical gear forms and pitch characteristics, there may be applications where other geometric relationships are preferable.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents.

Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for attachment to an associated planar member such as wall or wallboard which comprises:
    a housing having first and second sides;
    first and second elongated strap members each having first and second opposed sides, each strap member having rack gears extending longitudinally along the respective strap member, each strap member having first and second axial extremities, said second axial extremity of each of said strap members including a U-shaped claw, each said claw including a contact surface extending generally in a direction away from a side of a respective strap;
    each of said contact surfaces being disposed in oblique relationship to a side of a respective strap to which the contact surface is attached with the outboard extremity thereof being closer to said first axial extremity of said strap than the rest of said contact surface;
    a first receiving channel disposed on said first side;
    a second receiving channel disposed on said second side, each receiving channel including a ratchet, each ratchet being dimensioned and configured for engagement respectively with one of said rack gears whereby said claws may be inserted into a hole in an associated wall and the respective strap members may be thereafter be passed through said respective receiving channels to secure said housing in abutting relationship to the associated wall.

2. The apparatus as described in claim 1 wherein:
    first and second sides of the housing are opposed sides.

3. The apparatus as described in claim 1 wherein:
    said housing is an electrical junction box.

4. The apparatus as described in claim 1 wherein:
    said strap members are flexible.

5. The apparatus as described in claim 1 wherein:
    said strap members are nylon.

6. The apparatus as described in claim 1 wherein:
    each of said contact surfaces is disposed at an angle of between 3 and 9 degrees to a side of a respective strap to which the contact surface is attached.

7. An apparatus for attachment to an associated planar member such as wall or wallboard which comprises:
    an electrical junction box housing having first and second opposed sides;
    first and second elongated flexible strap members each having first and second opposed sides, each strap member having a rack gear extending longitudinally along one side of the respective strap member, each member having first and second axial extremities, said second axial extremity of each of said strap members including a U-shaped claw, each said claw including a contact surface extending generally in a direction away from a side of a respective strap;
    each of said contact surfaces being disposed in oblique relationship to a side of a respective strap to which the contact surface is attached with the outboard extremity thereof being closer to said first axial extremity of said strap than the rest of said contact surface;
    a first receiving channel disposed on said first side;
    a second receiving channel disposed on said second side, each receiving channel including a ratchet, each ratchet being dimensioned and configured for engagement respectively with one of said rack gears whereby said claws may be inserted into a hole in an associated wall and the respective strap members may be thereafter be passed through said respective receiving channels to secure said housing in abutting relationship to the associated wall.

8. The apparatus as described in claim 7 wherein:
    each of said contact surfaces is disposed at an angle of between 3 and 9 degrees to a side of a respective strap to which the contact is attached.

* * * * *